(12) United States Patent
Leyba

(10) Patent No.: US 9,501,529 B2
(45) Date of Patent: *Nov. 22, 2016

(54) SEARCHING CONTENT MANAGED BY A SEARCH ENGINE USING RELATIONAL DATABASE TYPE QUERIES

(71) Applicant: International Business Machines Corporation, Armonk, NY (US)

(72) Inventor: Todd Leyba, Potomac, MD (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/501,393

(22) Filed: Sep. 30, 2014

(65) Prior Publication Data

US 2015/0220594 A1 Aug. 6, 2015

Related U.S. Application Data

(63) Continuation of application No. 14/173,980, filed on Feb. 6, 2014.

(51) Int. Cl.
*G06F 7/00* (2006.01)
*G06F 17/30* (2006.01)

(52) U.S. Cl.
CPC ... *G06F 17/30498* (2013.01); *G06F 17/30466* (2013.01); *G06F 17/30569* (2013.01); *G06F 17/30595* (2013.01)

(58) Field of Classification Search
None
See application file for complete search history.

(56) References Cited

U.S. PATENT DOCUMENTS

| | | | |
|---|---|---|---|
| 5,379,419 A * | 1/1995 | Heffernan | G06F 17/30569 |
| 6,385,604 B1 | 5/2002 | Bakalash et al. | |
| 7,978,544 B2 | 7/2011 | Bernard | |
| 8,219,518 B2 | 7/2012 | Jin et al. | |
| 8,352,463 B2 | 1/2013 | Nayak et al. | |
| 8,447,775 B2 | 5/2013 | Vronay et al. | |
| 9,262,462 B2 | 2/2016 | Merriman | |
| 2005/0187915 A1* | 8/2005 | De Lury | G06F 17/3089 |
| 2008/0319958 A1* | 12/2008 | Bhattacharya | G06F 17/30389 |
| 2009/0019022 A1 | 1/2009 | Schallert et al. | |
| 2013/0060803 A1 | 3/2013 | Maman | |
| 2014/0172833 A1 | 6/2014 | Taylor | |
| 2014/0244680 A1 | 8/2014 | Chandran | |
| 2015/0142783 A1 | 5/2015 | Bruce | |
| 2015/0220601 A1 | 8/2015 | Leyba | |

FOREIGN PATENT DOCUMENTS

WO 2011057259 5/2011

* cited by examiner

*Primary Examiner* — Uyen Le
(74) *Attorney, Agent, or Firm* — Joe Polimeni; Edell, Shapiro & Finnan, LLC

(57) ABSTRACT

According to one embodiment of the present invention, a system searches content managed by a search engine. The system receives a relational database type query, translates the relational database type query into a query for the search engine, and submits the translated query to the search engine to retrieve information. The system formats resulting information from the search engine into a relational database query result set. Embodiments of the present invention further include a method and computer program product for searching content managed by a search engine in substantially the same manners described above.

6 Claims, 7 Drawing Sheets

SEARCHING CONTENT MANAGED BY A SEARCH ENGINE USING RELATIONAL DATABASE TYPE QUERIES

CROSS-REFERENCE TO RELATED APPLICATIONS

This application is a continuation of U.S. patent application Ser. No. 14/173,980, entitled "SEARCHING CONTENT MANAGED BY A SEARCH ENGINE USING RELATIONAL DATABASE TYPE QUERIES" and filed Feb. 6, 2014, the disclosure of which is incorporated herein by reference in its entirety.

BACKGROUND

1. Technical Field

Present invention embodiments relate to searching content managed by a search engine using queries of a type associated with relational database management systems, and more specifically, to querying full text search engines using structured query language statements via a Java database connectivity interface.

2. Discussion of the Related Art

Many organizations use full text search engines to manage information, which may be stored in sources internal and/or external to the organization. An index of documents is built by visiting and extracting ("crawling") content in the sources. Metadata fields may be defined and included in the index as well as the content and all of the words contained therein. The index is then used to identify documents that match criteria specified in a full text search query.

Documents in the index may have implied relationships to each other. However, search engines focus on providing lists of individual documents that match specified criteria, and generally do not provide access to information in the index in manners supported by relational database management systems. For example, search engines typically do not support queries that specify join operations or merge metadata field values from different document types to form a virtual document type. Attempts to enable use of relational database type queries with a full text search engine index have been based upon integrating full text search capabilities into a relational database itself.

BRIEF SUMMARY

According to one embodiment of the present invention, a system searches content managed by a search engine. The system receives a relational database type query, translates the relational database type query into a query for the search engine, and submits the translated query to the search engine to retrieve information. The system formats resulting information from the search engine into a relational database query result set. Embodiments of the present invention further include a method and computer program product for searching content managed by a search engine in substantially the same manners described above.

BRIEF DESCRIPTION OF THE SEVERAL VIEWS OF THE DRAWINGS

Generally, like reference numerals in the various figures are utilized to designate like components.

DETAILED DESCRIPTION

Present invention embodiments relate to searching content managed by a search engine using types of queries associated with relational database management systems (RDBMs). For example, queries expressed as structured query language (SQL) statements may be applied against a full text search engine (FTSE). A driver module (e.g., a Java® database connectivity (JDBC®) driver) may be used to translate the SQL statements to native requests for the search engine, and to form SQL results sets based on results returned by the search engine.

One aspect of a present invention embodiment is to facilitate use of search-engine-maintained information that indicates relations between documents or types of documents. Another aspect is to enable a conventional full text search engine to support relational database type queries by emulating an RDBMS in a driver, rather than by integrating an actual RDBMS with a search engine. Still another aspect is to provide a standard interface to the content managed by search engines.

Figure 1:
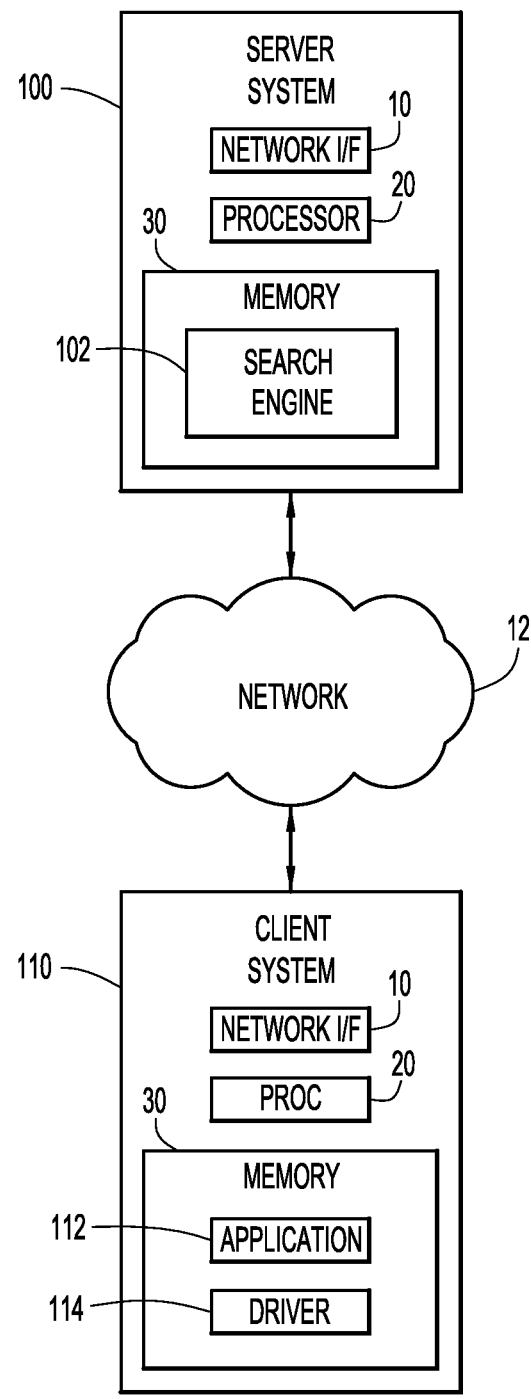
FIG. 1 is a diagrammatic illustration of an example computing environment for an embodiment of the present invention.

An example environment for present invention embodiments is illustrated in FIG. 1. Specifically, the environment includes one or more server systems 100 and one or more client or end-user systems 110. Server systems 100 and client systems 110 may be remote from each other and communicate over a network 12.

Network 12 may be implemented by any number of any suitable communications media (e.g., wide area network (WAN), local area network (LAN), Internet, intranet, etc.). Alternatively, any number of server systems 100 and client systems 110 may be local to each other, and communicate via any appropriate local communication medium (e.g., local area network (LAN), hardwire, wireless link, intranet, etc.).

A server system 100 may include a search engine 102. The search engine may be implemented across plural server systems. Alternatively, the search engine may reside on a client system 110 or other computer system in communication with the client system.

Client systems 110 may include application 112 and driver 114, and may communicate with the search engine (e.g., via network 12). Driver 114 receives relational-type query statements from application 112, obtains corresponding results from the search engine, and returns formatted query results to the application. The client systems may present any graphical user (e.g., GUI, etc.) or other interface (e.g., command line prompts, menu screens, etc.) to receive commands or statements from users and interact with the application, driver, search engine, and/or other modules or services. Alternatively, the application and/or driver may reside on a server system 100 or other computer system in communication with the server system.

Server systems 100 and client systems 110 may be implemented by any conventional or other computer systems preferably equipped with a display or monitor, a base (e.g., including at least one processor 20, memories 30 and/or internal or external network interface or communications devices 10 (e.g., modem, network cards, etc.), optional input devices (e.g., a keyboard, mouse, or other input device), and any commercially available and custom software (e.g., search engine software, JDBC software, application software, etc.).

The search engine, application, and driver may include one or more modules or units to perform the various functions of present invention embodiments described below (e.g., defining metadata fields for a search engine index, crawling content, translating SQL statements to search engine queries, building SQL result sets from search engine results, etc.), may be implemented by any combination of any quantity of software and/or hardware modules or units, and may reside within memory 30 of a server system and/or client systems for execution by processor 20.

Search engine 102 may be a full text search engine (FTSE) or other searchable data system that includes infrastructure which may be used to support some or all of the relational concepts exhibited in a conventional RDBMS. In particular, the search engine is able to search a corpus of documents for those documents that meet specific search criteria (a search engine's main design point). In addition, the search engine is able to associate metadata fields with crawled and indexed documents and search based on those discrete fields. For example, a type of document may be associated with a metadata field for an individual's social security number (SSN), and search criteria may include a specification of the value of that field (e.g., SSN=555-55-5555). The fields may be used to explicitly or implicitly group documents together to define logical document types. A set of one or more fields common to a document type may be used to distinguish between the different document type instances in the corpus. Most modern search engines provide these features.

Fields for logical document types to be included in an index may be defined when the index is created or updated. One field associated with each document may be the document's unique resource identifier (URI). The URI uniquely identifies the document. In addition, other fields may be assigned to the documents being indexed (e.g., title, author, date, etc.), one or more of which may also uniquely identify a document. Fields that uniquely identify documents (e.g., the URI) may operate as "key" metadata fields that can be used to link documents to other document types and instances in the collection.

Specific crawlers may be used for corresponding specific document types. For example, an insurance agency may use separate crawlers to index insurance claim forms, documents containing information about individual insured customers, documents containing information about individual insurance agents, and the like. Each document type may have its own set of metadata fields. A crawler for a given document type may be configured to assign the values of each field for each document it processes.

Initially, fields may be defined for a single crawler that is used to visit a set of homogenous documents for an index, and that set of fields may represent a single document type. Use of additional crawlers may introduce new documents types into the index, each with their own fields that may or may not overlap with previously defined fields. As a consequence, different document types may exist inside of a search engine depending on how the fields are defined and the crawlers that are used.

According to an embodiment of the present invention, a common field (denoted, e.g., "TYPE," "DocType," or the like) may be used to indicate document types. For example, a metadata field denoted TYPE may be included for each document in the index, where the TYPE field for each document is assigned a value indicating the document's type (e.g., of "Claims" for documents containing information about individual insurance claims, "Agents" for documents containing information about individual insurance agents, etc.). These document types may be considered to correspond to tables of a relational database, where the fields of a document type included in the index correspond to columns of the tables, and instances of documents of that type correspond to rows of the table. Relational database type queries may be mapped to search engine queries by driver 114 based on this correspondence.

In one embodiment of the present invention, driver 114 is a JDBC driver and application 112 is a Java client application. JDBC is an application programming interface (API) and specification designed for connecting to relational databases that support SQL. It comprises a package of object-oriented Java objects (e.g., Connect, ResultSet, Statement, etc.), each of which contains API methods (e.g., Connect( ), DisConnect( ), PrepareSQL( ), etc.). JDBC drivers are widely used as the means to access relational database content. Relational database vendors generally offer a JDBC driver for their product. The primary job of the JDBC driver is to map the functionality dictated by a SQL expression to the methods of the underlying database technology used to satisfy the SQL request, execute that request, and format the results according to the JDBC specification. According to an embodiment of the present invention, a JDBC driver may be implemented to map the functionality dictated by a SQL expression to the methods of a search engine (e.g., a FTSE) rather than an RDBMS. In particular, a JDBC driver for a FTSE may translate SQL statements into valid search expressions for the search engine and submit them to the search engine for processing. The results returned by the search engine may be formatted into a JDBC conforming SQL result set and returned by the JDBC driver to the calling application.

Figure 2:
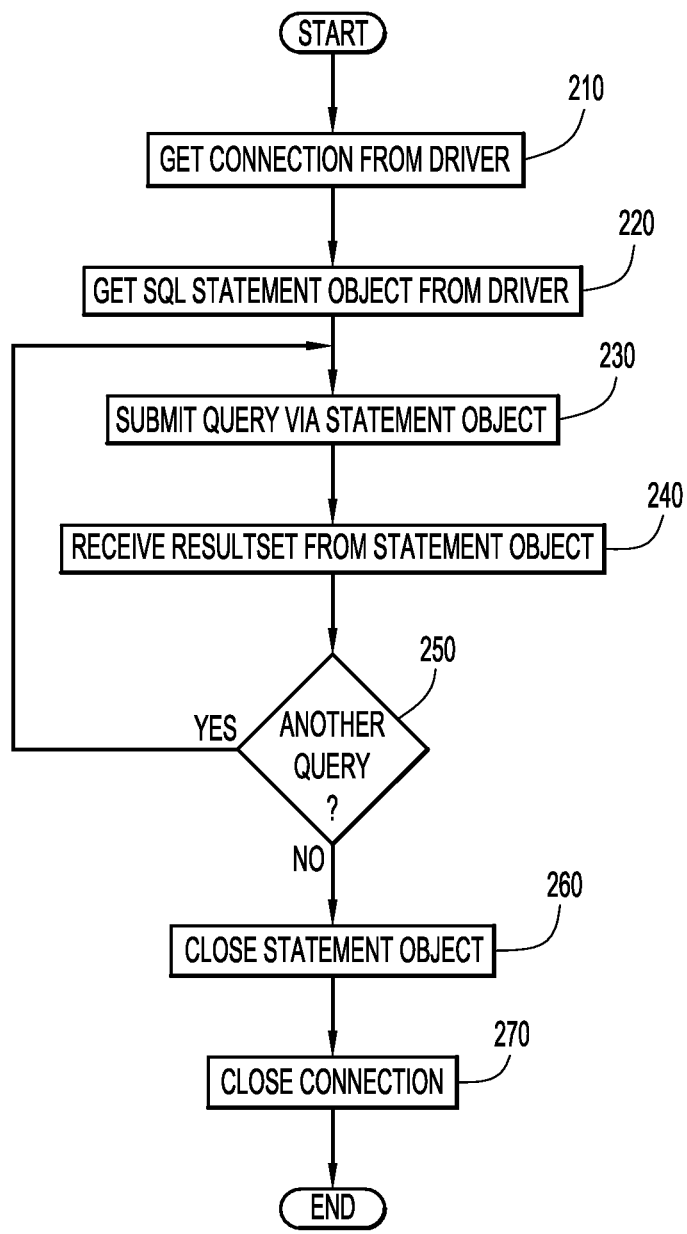
FIG. 2 is a flow diagram illustrating an example manner of submitting and receiving results for relational database type queries via a driver to search content managed by a search engine according to an embodiment of the present invention.

An example manner of submitting queries to a search engine from a Java client application via a JDBC driver according to an embodiment of the present invention is illustrated in FIG. 2. Initially, at step 210, the Java client application requests a connection to the search engine from the JDBC driver, for example as follows:

```
Connection conn = DriverManager.getConnection(DBURL,
    USERID, PASSWORD);
``` where DriverManager and Connection are objects of the JDBC API, getConnection is a method of the DriverManager object, DBURL is a universal resource locator (URL) for the data source (e.g., search engine 102), and USERID and PASSWORD are a user identifier and associated password for accessing the data source. The DBURL may have the form jdbc:ftse://hostname:8393/IndexID, where ftse specifies the driver, hostname indicates the server system, 8393 indicates a port number, and IndexID indicates the data source (e.g., search engine, database, etc.). The specified driver responds to the request by attempting to connect to the data source, and, if successful, returns a Connection object to the application.

At step 220, the application uses the Connection object to create a JDBC Statement object, for example as follows:

Statement stmt=conn.createStatement( );

The createStatement method issues a request for a Statement object to the driver. The driver creates the Statement object and returns it to the application.

At step 230, the application uses the Statement object to issue one or more queries to the search engine, for example:

ResultSet rs=stmt.executeQuery (STATEMENT);

where STATEMENT is a string expressing a query (e.g., a SQL SELECT statement). The executeQuery function call sends the query expressed by the STATEMENT string to the driver, which translates the query into one or more queries in a query language understood by the search engine, submits the translated query or queries to the search engine, receives results from search engine, creates a JDBC ResultSet object containing the search results, and returns the ResultSet to the application. The application receives the ResultSet at step 240. The application may interact with the ResultSet to examine and/or display the results.

At step 250, the application determines whether another query remains to be submitted to the search engine. If so, processing returns to step 230. Otherwise, the application closes the statement at step 260 and closes the connection at step 270 using, for example, the function calls:

stmt.close ( );
conn.close ( );

In response to closing the connection, the driver may log the user indicated by USERID out of the underlying search engine, and release resources associated with the connection.

Figure 3:
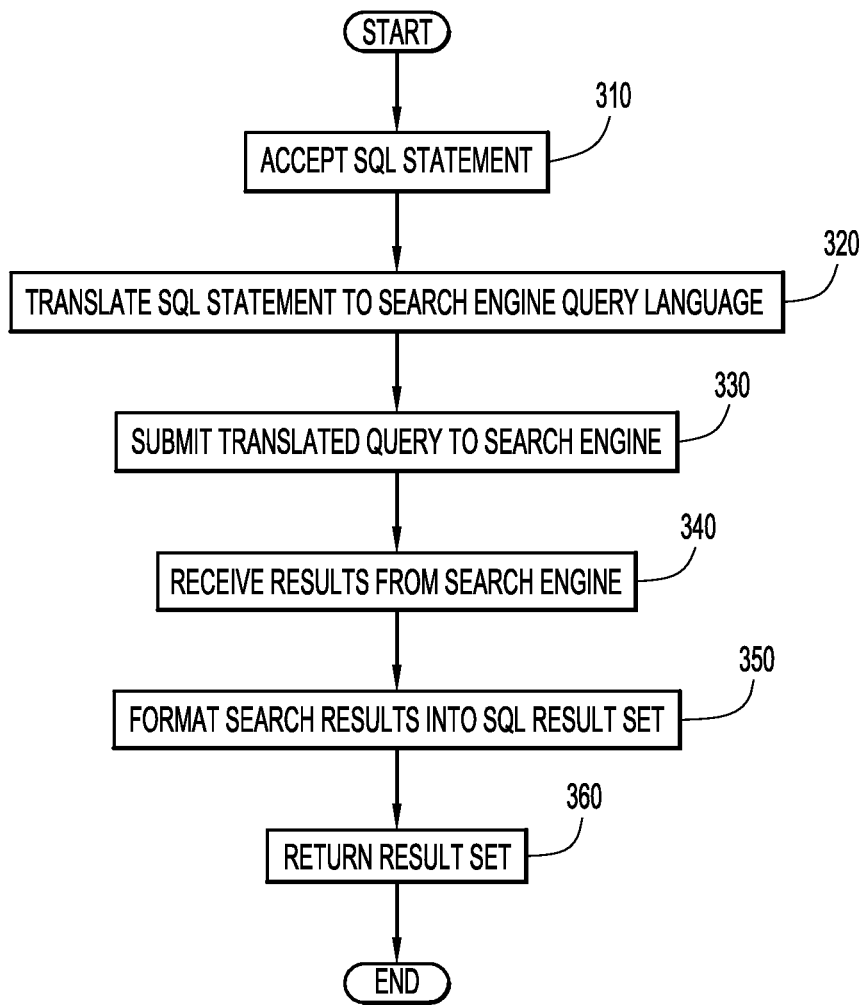
FIG. 3 is flow diagram illustrating an example manner of providing results from a search engine in response to a relational database type query according to an embodiment of the present invention.

An example manner of providing results from a search engine in response to a relational database type query according to an embodiment of the present invention is illustrated in FIG. 3. In particular, at step 310, driver 114 receives a relational database type query from application 112. By way of example, the relational database type query may be expressed as a SQL statement of the following form:

SELECT <column(s)> FROM <table> WHERE <filter criteria>.

The <table> parameter is a document type in the search engine to which the search is to limited. The <column(s)> parameter is a list of search engine fields associated with the document type that are to be returned in the results. The <filter criteria> parameter indicates any additional selection criteria that are to be applied to further narrow the result set.

An example of a SQL statement of this form is

```
SELECT empno, name, cur_job_start_date
    FROM employees
    WHERE cur_job_start_date <= "2012-06-01"
```

This query requests a search for employees that have been in their current job since Jun. 1, 2012, where the results include an employee identifier number (empno), name (name), and current job start date (cur_job_start_date). For example, the results may appear as shown below.

| empno | name | cur_job_start_date |
|---|---|---|
| 000130 | DELORES QUINTANA | 1991-10-01 |
| 000190 | JAMES WALKER | 1987-06-01 |
| Total rows = 2 | | |

In the example above, two documents match the specified criteria.

At step 320, driver 114 translates the SQL statement into a query for the search engine. For example, the SQL statement above may be translated into the following search engine query: documentType="employees" AND cur_job_start_date<="2012-06-01". The precise form of the translated query may depend on the particular query language used by the search engine. The translation above uses a fielded search expression. The first part of the expression restricts the result set to only employee type documents in the index. The second part of the expression requires that the current job start date must have a value that is less than or equal to Jun. 1, 2012.

The driver submits the translated query to the search engine at step 330, and receives results from the search engine at step 340. The search engine returns only results that meet the specified search criteria. The search engine includes all available fields for each document in the results. (Alternatively, the search engine may allow a query to specify which fields are to be included in the search results. In this case, the driver may specify the fields requested by the SQL statement in the search engine query at step 320.) At step 350, the driver uses the results from the search engine to build a SQL result set (e.g., in the form of a JDBC ResultSet object). In forming the SQL result set, the driver includes only the fields requested in the SQL select statement. The driver returns the SQL result set to the application at step 360. If the SQL statement requested fields that are not returned by the search engine, the driver may return an error message to the application.

In the case of relational type queries that include a join operation, driver 114 may use a plurality of search engine queries to obtain results and then format the results of the queries into a single result set. In relational database terms, a join clause combines records from two or more tables in a relational database. In the context of a present invention embodiment, the term "table" may refer to a document type maintained by the search engine, "column" to fields defined for that document type, and "row" to field values for a document of that type. In particular, a join clause may be used to combine fields from two tables (document types) by using column values (field values) common to each. For example, an inner join creates a new result table by combining column values of two tables A and B based upon a join-predicate. The query compares each row of A with each row of B to find all pairs of rows that satisfy the join-predicate. When the join-predicate is satisfied, column values for each matched pair of rows of A and B are combined into a result row. The result of the join can be described as the outcome of first taking the Cartesian product (or cross join) of all records in the tables (e.g., combining every record in table A with every record in table B), and returning all records that satisfy the join predicate. In SQL, the JOIN keyword may be used to specify the table to join, and the ON keyword to specify the predicates for the join, as in the following example:

```
SELECT Employee.Name, Employee.DeptID, Department.Name
  FROM Employee
  INNER JOIN Department
    ON Employee.DeptID = Department.DeptID;
```

In this example, "Employee" is the first table, "Department" is the second table, and "Employee.DeptID=Department.DeptID" is the join predicate. Applying the example SQL statement above to the tables with the example content shown in the Employee and Department tables below illustrates operation of the join clause and a manner in which driver 114 may translate relational database type queries including joins into one or more search engine queries.

TABLE 1

Employee Table

| Name | DeptID |
|---|---|
| Rafferty | 31 |
| Jones | 33 |
| Steinberg | 33 |
| Robinson | 34 |
| Smith | 34 |
| John | NULL |

TABLE 2

Department Table

| DeptID | Name |
|---|---|
| 31 | Sales |
| 33 | Engineering |
| 34 | Clerical |
| 35 | Marketing |

In the above tables, the DeptID column of the Department table (Department.DeptID) is the primary key, while Employee.DeptID is a foreign key. In the Employee table, the employee "John" has not been assigned to a department, and no employees are assigned to the "Marketing" department.

The results of applying the example SQL statement to the example Department and Employee tables are shown in Table 3 below.

TABLE 3

Result of Inner Join

| Employee.Name | Employee.DeptID | Department.Name |
|---|---|---|
| Robinson | 34 | Clerical |
| Jones | 33 | Engineering |
| Smith | 34 | Clerical |
| Steinberg | 33 | Engineering |
| Rafferty | 31 | Sales |

The processing of the inner join cannot in general be done with a single query to the search engine. However, the join may be performed using more than one query to the search engine. A first query to the search engine searches the first table of the join clause (e.g., Employee) to determine join key values appearing in that table (e.g., 31, 33, and 34). This query is referred to as the "first-table-query." For the example SQL JOIN statement above, the first-table-query may be, e.g., "type='Employee'" or the like, depending on the search engine query language.

The results of this first query are used to issue a second-table-query based on the keys specified in the ON clause. For example, the second-table-query may be "type='Department' AND (deptid=31 OR deptid=33 OR deptid=34)."

For large result sets, where the list of key values returned by the first query can be too lengthy for an efficient second query expression to be formed and executed, the second-table-query may be split into several second-table-queries (of fewer keys) by the driver and submitted to the search engine individually. The results returned by the second-table-queries are merged by the driver as if they were submitted as a single query. For example, the driver may limit the number of keys included in queries against the second query to two, and use the second-table-queries: "type='Department' AND (deptid=31 OR deptid=33)" and "type='Department' AND (deptid=34)." The driver may submit second-table-queries until all of the foreign keys returned by the first table result set have been used.

Figure 4:
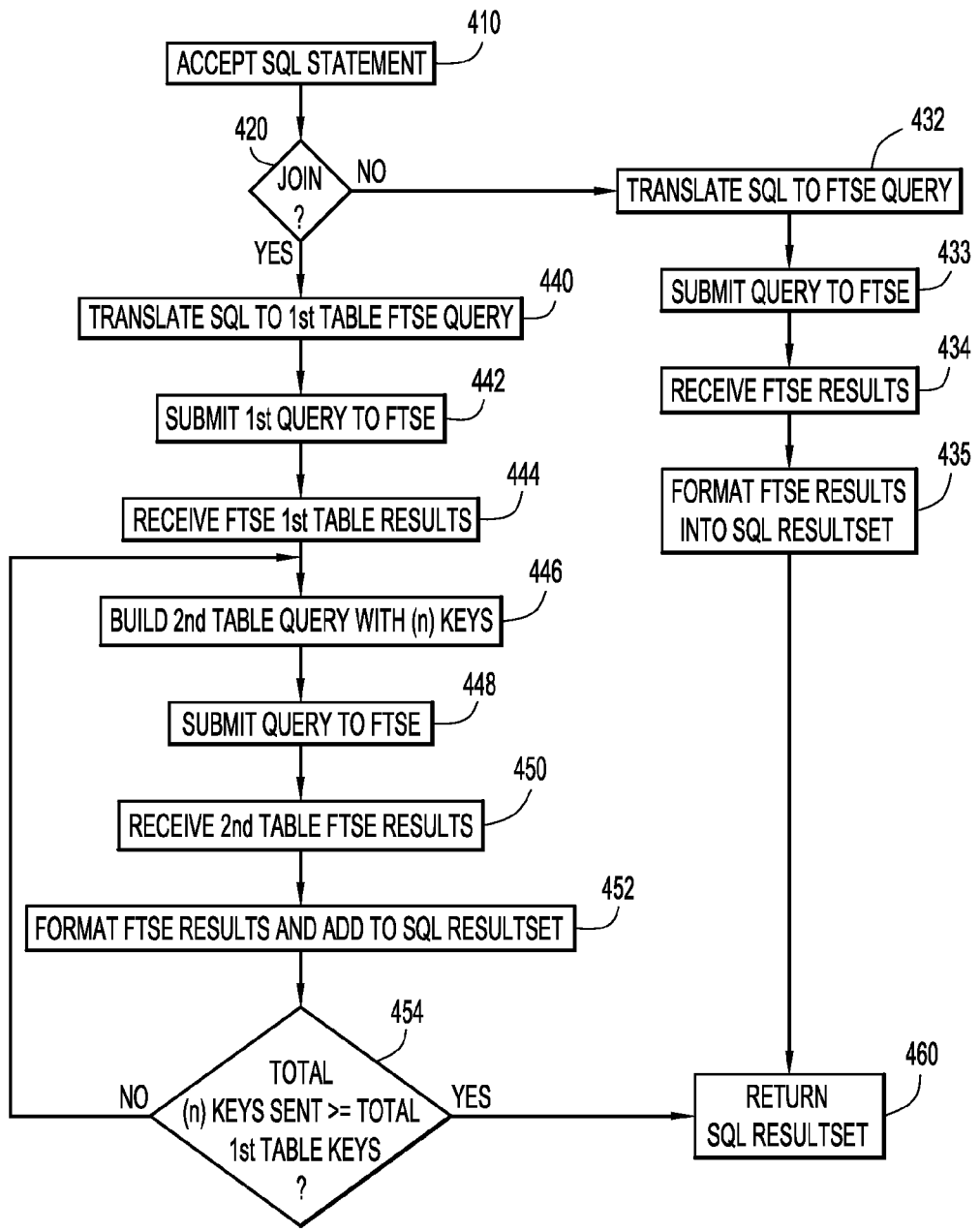
FIG. 4 is flow diagram illustrating an example manner of providing results from a search engine in response to a relational database type query that may include a join expression according to an embodiment of the present invention.

A flow diagram illustrating an example manner of providing results from a search engine in response to a relational database type query that may include a join expression according to an embodiment of the present invention is illustrated in FIG. 4. In particular, driver 114 receives a SQL statement from application 112 at step 410. At step 420, the driver reads the SQL statement and determines whether it contains a join clause. If not, the driver translates the SQL statement to a search engine query at step 432, submits the search engine query to the search engine at step 433, receives results from the search engine at step 434, formats the results from the search engine into a SQL result set at step 435, and returns the SQL result set at step 460.

If the driver determines that the SQL statement does include a join clause at step 420, the driver forms a search engine query against the first document type of the join clause at step 440 (e.g., "type='Employee' AND deptid=*"). This query is referred to as the first-table-query. The driver submits the first-table-query to the search engine at step 442. At step 444, the driver receives results for the first-table-query from the search engine. The driver examines the results to determine the join key field values that appear in the first document type of the join expression (e.g., deptid values 31, 33, and 34). At step 446, the driver selects a number N of these join key values, and forms a search engine query against the second document type of the join clause (e.g., "type='Department' AND (deptid=31 OR deptid=33)" for N=2). This query is referred to as a second-table-query. N may be a user-configurable parameter (e.g., 2, 10, 100, etc.). The second-table-query requests documents of the second type specified in the join clause that satisfy the join predicate for the selected join key values. The driver submits the second-table-query to the search engine at step 448, and receives results from the search engine at step 450. At step 452, the driver combines results of the second-table-query with corresponding results of the first-table-query, formats the combined results, and adds the formatted results to the SQL result set. At step 454, the driver determines whether any join key values in the first table (e.g., deptid value 34 in the example above) remain to be included in a second-table-query. If so, processing returns to step 446 and another second-table-query is built using key values from those that remain to be included in a second-table-query. Otherwise, the driver returns the SQL result set at step 460.

Figure 5:
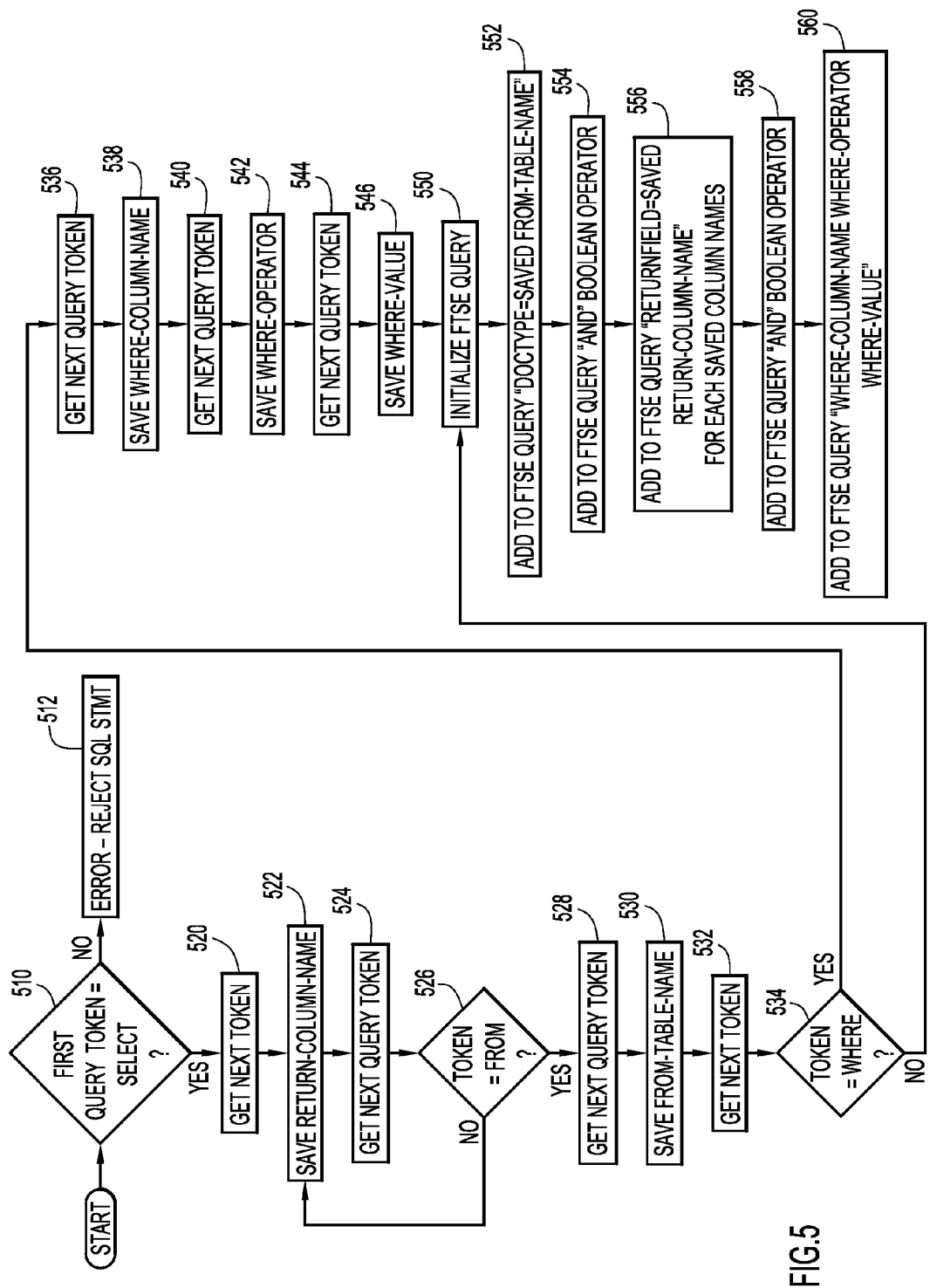
FIG. 5 is a flow diagram illustrating an example manner of translating a relational database type query to a search engine query language according to an embodiment of the present invention.

An example manner of translating a relational database type query (e.g., a SQL SELECT statement) to a search engine query according to an embodiment of the present invention is illustrated in FIG. 5. Initially, at step 510 driver 114 determines whether the first token of the relational database type query expression is "SELECT." If not, the driver may return an error at 512 and end processing of the expression. In other words, the driver may ignore expressions other than queries. For example, the driver need not support modifying data in the search engine. If the first token is "SELECT," the driver gets the next token at step 520. At step 522, the driver saves the current token in a list of columns to include in the output. This list is referred to as return-column-names. At step 524, the driver gets the next token. At step 526, the driver determines whether the current token is "FROM." If not, then the token is the name of another column to include in the list of return-column-names and processing returns to step 522. If the token is "FROM" at step 526, no further columns remain to be included in the output. The driver gets the next token at step 528. This token is the name of the table (document type) from which results are to be selected, and is saved as the from-table-name at step 530. The driver gets the next token at step 532. At step 534, the driver determines whether the current token is "WHERE." If not, processing proceeds to step 550. If the token is "WHERE," the driver gets the next token at step 536, and saves this token as the where-column-name at step 538. At step 540, the driver gets the next token, and saves this token as the where-operator at step 542. At step 544, the driver gets the next token and saves this token as the where-value at step 546.

At step 550, the driver creates and initializes a query for the search engine (e.g., allocates memory for an initially empty string of text to express the search engine query). At step 552, the driver adds text of the form "<doctype>=<from-table-name>" to the search engine query, where <doctype> is the name of the field indicating the document type in search engine (e.g., "TYPE" in the examples above), and <from-table-name> is the token saved as from-table-name. At step 554, the driver adds the Boolean operator "AND" to the search engine query. At step 556, the driver appends text of the form "returnfield=<column-name>" to the search query for each value of <column-name> in the from-column-name list, where "returnfield" is a keyword to indicate fields that should be included in the search results. Alternatively, if the search engine does not support specification of return fields in the search query, steps 554 and 556 may be omitted. At step 558, the driver adds the Boolean operator "AND" to the search engine query. At step 560, the driver adds text of the form "<where-column-name> <where-operator> <where-value>" to the search expression. The terms <where-column-name>, <where-operator>, and <where-value> are the tokens saved as where-column-name, where-operator, and where-value, respectively. Other forms of relational database type queries may be translated in a similar manner.

Figure 6:
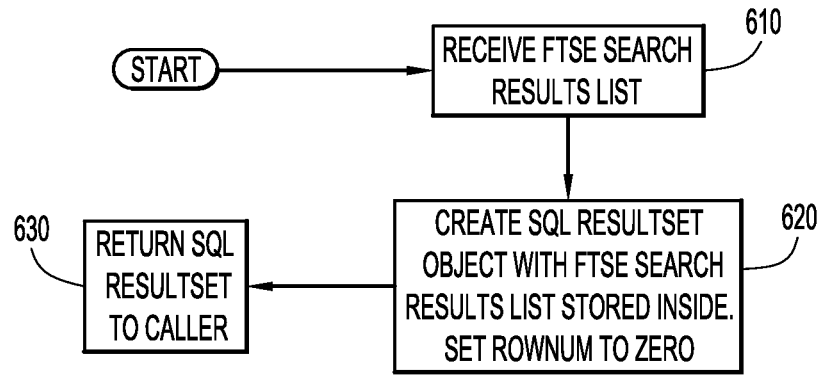
FIG. 6 is a flow diagram illustrating an example manner of forming a relational database type results set from results provided by a search engine according to an embodiment of the present invention.

An example manner of forming a relational database type results set from search engine results according to an embodiment of the present invention is illustrated in FIG. 6. Initially, driver 114 receives search results from the search engine at step 610. At step 620, the driver creates a ResultSet object (e.g., a JDBC compatible ResultSet object) with the search engine results stored inside, and sets a data member (referred to as rowNum) of the ResultSet to zero. The first row of the ResultSet corresponds to rowNum=1. In other words, the rowNum is initialized to a position preceding the first row. The driver returns the ResultSet object to application 112 at step 630.

Figure 7:
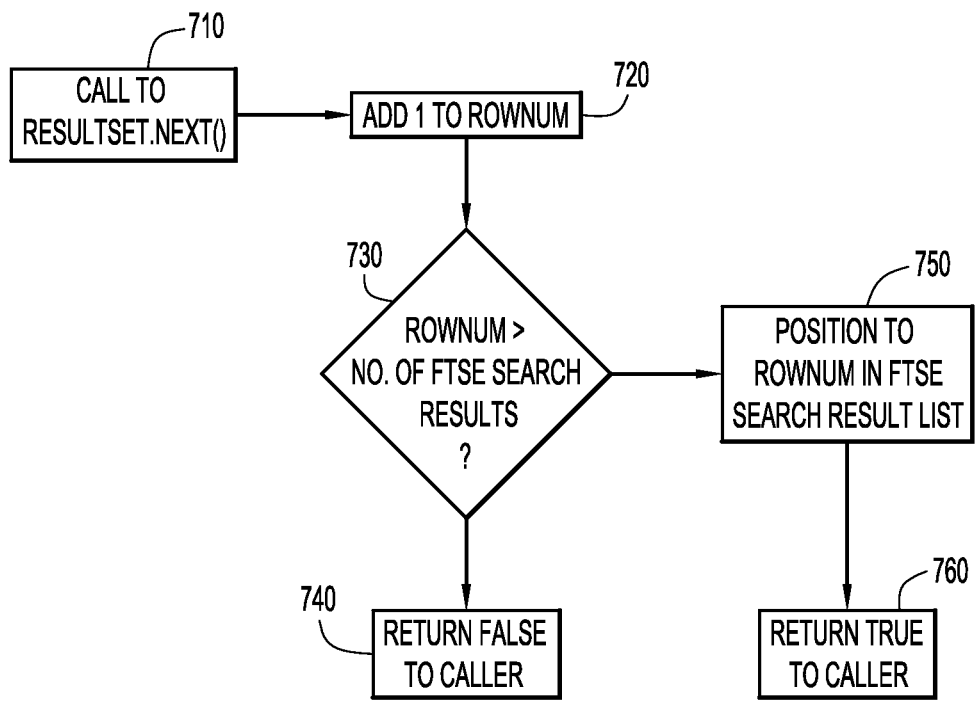
FIG. 7 is a flow diagram illustrating an example manner of positioning a result cursor to a result of a result set according to an embodiment of the present invention.

An example manner of positioning a result cursor to a next result of a result set according to an embodiment of the present invention is illustrated in FIG. 7. Initially, at step 710, application 112 calls a next( ) method of a ResultSet object (e.g., a JDBC compatible ResultSet object) received from driver 114. In response, the next( ) method increments rowNum by one at step 720. At step 730, the next( ) method determines whether rowNum is greater than the number of rows in the ResultSet. If so, the next( ) method returns False at step 740. Otherwise, the next( ) method sets a current row position cursor to rowNum in the ResultSet at step 750, and returns True at step 760.

Figure 8A:
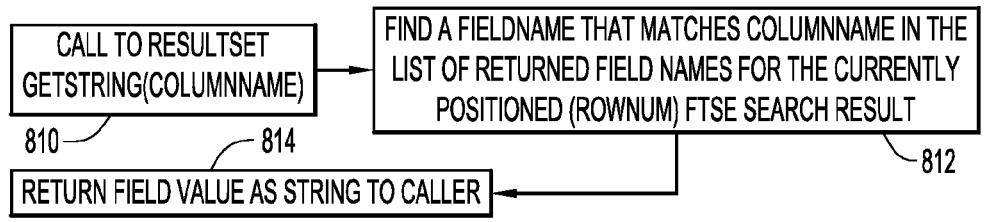
FIGS. 8A-8D are flow diagrams illustrating example manners of accessing values of fields of a result in a result set according to an embodiment of the present invention.

Example manners of accessing values of fields of a result in a result set (e.g., A JDBC compatible ResultSet) according to an embodiment of the present invention are illustrated in FIGS. 8A-8D. In particular, a manner of accessing a field containing a string of text is illustrated in FIG. 8A. At step 810, application 112 calls a GetString(ColumnName) method of a ResultSet object, where the argument ColumnName may be a string expressing the name of a field included in the search results. In response, at step 812, the GetString( ) method finds a field in the search results having a name that matches the argument and the value of that field for the document indicated by the current cursor position (rowNum) of the ResultSet. The GetString( ) method returns this field value to the calling application as a text string object at step 814.

Figure 8B:
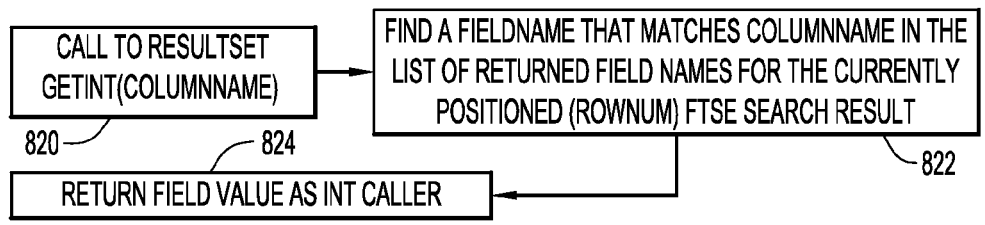

A manner of accessing a field containing an integer is illustrated in FIG. 8B. At step 820, application 112 calls a GetInt(ColumnName) method of a ResultSet object, where the argument ColumnNamne may be a string expressing the name of a field included in the search results. In response, at step 822, the GetInt( ) method finds a field in the search results having a name that matches the argument and the value of that field for the document indicated by the current cursor position (rowNum) of the ResultSet. The GetInt( ) method returns this field value to the calling application as an integer data type at step 824.

Figure 8C:
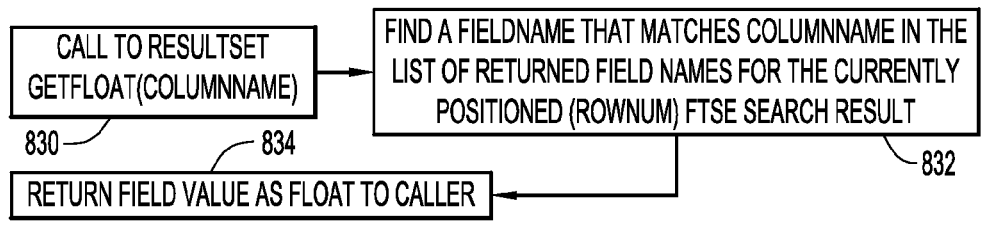

A manner of accessing a field containing an floating point number is illustrated in FIG. 8C. At step 830, application 112 calls a GetFloat(ColumnName) method of a ResultSet object, where the argument ColumnName may be a string expressing the name of a field included in the search results. In response, at step 832, the GetFloat( ) method finds a field in the search results having a name that matches the argument and the value of that field for the document indicated by the current cursor position (rowNum) of the ResultSet. The GetFloat( ) method returns this field value to the calling application as an integer data type at step 834.

Figure 8D:
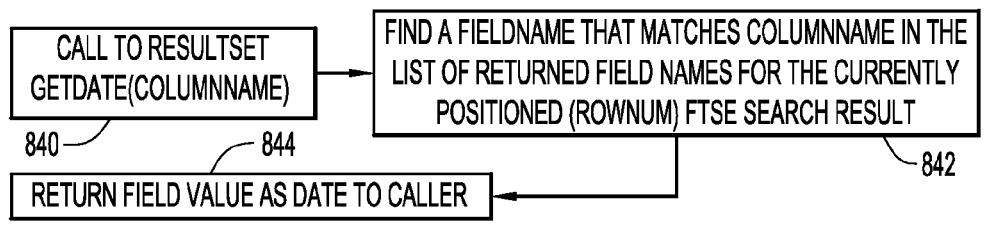

A manner of accessing a field containing a date is illustrated in FIG. 8D. At step 840, application 112 calls a GetDate(ColumnName) method of a ResultSet object, where the argument ColumnName may be a string expressing the name of a field included in the search results. In response, at step 842, the GetDate( ) method finds a field in the search results having a name that matches the argument and the value of that field for the document indicated by the current cursor position (rowNum) of the ResultSet. The GetDate( ) method returns this field value to the calling application as an integer data type at step 844.

Fields containing other scalar data type values (e.g., long integers, short integers, Boolean values, double precision floating point values, time stamps, etc.) may be accessed in a similar manner.

It will be appreciated that the embodiments described above and illustrated in the drawings represent only a few of the many ways of implementing embodiments for searching content managed by a search engine using relational database type queries.

The environment of the present invention embodiments may include any number of computer or other processing systems (e.g., client or end-user systems, server systems, etc.) and storage systems (e.g., file systems, databases, or other repositories), arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., desktop, laptop, PDA, mobile devices, etc.), and may include any commercially available operating system and any combination of commercially available and custom software (e.g., database software, communications software, etc.). These systems may include any types of monitors and input devices (e.g., keyboard, mouse, voice recognition, touch screen, etc.) to enter and/or view information.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, intranet, Internet, hardwire, modem connection, wireless, etc.). For example, the functions of the present invention embodiments may be distributed in any manner among various server systems, end-user/client and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of data storage systems and structures to store information. The data storage systems may be implemented by any number of any conventional or other databases, file systems, caches, repositories, warehouses, etc.

The present invention embodiments may employ any number of any type of user interface (e.g., Graphical User Interface (GUI), command-line, prompt, etc.) for obtaining or providing information, where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, touch screen, pen, etc.).

It is to be understood that the software of the present invention embodiments could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The present invention embodiments are not limited to the specific tasks, algorithms, parameters, data, or network/environment described above, but may be utilized for searching any type of content managed (e.g., insurance data, personnel data, emails, legal documents, etc.) by any type of search engine (e.g., full text search engine, metadata search engine, dictionary, encyclopedia, file manager, etc.) using any relational database type queries (e.g., SELECT statements in any SQL dialect, Datalog, LINQ, etc.) and an API (e.g., JDBC, C-language database interfaces, Python database interfaces, etc.). The search engine may use any query language, and the driver may translate relational database type queries of any type into any query language using conventional or other translation methods.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method of searching documents managed by a search engine comprising:

receiving a relational database type query in a form for retrieving data from one or more tables of a relational database;

translating the relational database type query into a query for the search engine and submitting the translated query to the search engine to retrieve information from the documents with text satisfying the translated query, wherein each document is associated with an indicator corresponding to a table of the relational database; and formatting resulting information of the documents from the search engine into a relational database query result set by extracting data specified in the relational database type query from the resulting information.

2. The computer-implemented method of claim 1, wherein the relational database type query includes a JOIN operation between first and second tables, and the translating the relational database type query includes:

generating a first query for the search engine corresponding to the first table from the relational database type query and submitting the first query to the search engine to retrieve information;

generating a second query for the search engine corresponding to the second table from the relational database type query, wherein the second query utilizes information retrieved for the first query; and submitting the second query to the search engine to retrieve information.

3. The computer-implemented method of claim 1, wherein a Java Database Connector Interface (JDBC) interfaces the search engine and receives and processes the relational database type query to retrieve the information.

4. The computer-implemented method of claim 1, wherein the search engine includes a full text search engine.

5. The computer-implemented method of claim 1, wherein a relational database table corresponds to a document type of the search engine, rows of the relational database table correspond to a document type instance of the search engine, and columns of the relational database table correspond to fields of the document type.

6. The computer-implemented method of claim 1, wherein the relational database type query includes a Structured Query Language (SQL) query.

\* \* \* \* \*